US 7,863,533 B2

(12) United States Patent
Hamel et al.

(10) Patent No.: US 7,863,533 B2
(45) Date of Patent: Jan. 4, 2011

(54) CANTILEVERED PUSH BUTTON HAVING MULTIPLE CONTACTS AND FULCRUMS

(75) Inventors: Bradley J. Hamel, Sunnyvale, CA (US); Tang Yew Tan, San Francisco, CA (US); Erik Wang, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 188 days.

(21) Appl. No.: 12/239,102

(22) Filed: Sep. 26, 2008

(65) Prior Publication Data

US 2009/0301857 A1    Dec. 10, 2009

Related U.S. Application Data

(60) Provisional application No. 61/059,753, filed on Jun. 7, 2008.

(51) Int. Cl.
*H01H 23/00* (2006.01)

(52) U.S. Cl. .................. 200/339; 200/5 R; 200/553

(58) Field of Classification Search ................ 200/512, 200/516, 517, 553, 557, 558, 339; 341/20–22; 345/156, 157, 161, 168, 169, 184
See application file for complete search history.

(56) References Cited

U.S. PATENT DOCUMENTS

| | | | | |
|---|---|---|---|---|
| 5,329,278 A | * | 7/1994 | Dombroski | 341/20 |
| 5,508,479 A | * | 4/1996 | Schooley | 200/5 R |
| 5,584,380 A | * | 12/1996 | Naitou | 200/315 |
| 6,239,392 B1 | * | 5/2001 | Serizawa et al. | 200/5 R |
| 6,246,019 B1 | * | 6/2001 | Nakamura et al. | 200/6 A |
| 6,274,826 B1 | * | 8/2001 | Serizawa et al. | 200/5 R |
| 6,961,052 B1 | * | 11/2005 | Vaziri | 345/184 |
| 6,967,300 B1 | * | 11/2005 | Mizuno et al. | 200/512 |
| 6,995,326 B2 | * | 2/2006 | Sugimura et al. | 200/5 R |
| 7,259,339 B1 | * | 8/2007 | Babella et al. | 200/5 A |

* cited by examiner

*Primary Examiner*—Michael A Friedhofer
(74) *Attorney, Agent, or Firm*—Beyer Law Group LLP

(57) ABSTRACT

A cantilevered push button adapted for accepting an input on an electrical or electronic device is disclosed. The button can include an elongated button top component disposed about an exterior surface of an electrical or electronic device such that it is accessible to a user, and having two opposing distal ends associated with separate user inputs. A first fulcrum is located between the first distal end and the midpoint of the elongated button top component, while a second fulcrum is located between the second distal end and the midpoint. A first electrical contact is associated with the first distal end, such that when a user presses on the first distal end, the elongated button top component pivots about the second fulcrum and the first electrical contact is actuated. A second electrical contact is similarly associated with the second distal end and first fulcrum.

20 Claims, 6 Drawing Sheets

CANTILEVERED PUSH BUTTON HAVING MULTIPLE CONTACTS AND FULCRUMS

CROSS REFERENCE TO RELATED APPLICATIONS

This application claims priority to U.S. Provisional Patent Application No. 61/059,753, filed Jun. 7, 2008, and entitled "CANTILEVERED PUSH BUTTON HAVING MULTIPLE CONTACTS AND FULCRUMS," which is incorporated herein by reference in its entirety and for all purposes.

TECHNICAL FIELD

The present invention relates generally to push buttons, and more particularly to the use of cantilevered push buttons on electrical or electronic devices.

BACKGROUND

Media players, cellular telephones and numerous other electrical or electronic personal devices or appliances are now ubiquitous. Such devices often require ways of inputting information or commands by a user, with resulting features including touch screens, dials, knobs and push buttons. Such buttons can be part of a keyboard, a 10-key pad, or can be used in isolation, as desired by a designer. One drawback to using push buttons as a means for permitting input can be a cluttered or complex appearance for the overall device where many such buttons are used.

Cantilevered push buttons, also known as seesaw buttons, are one way of providing the functional effect of two buttons while providing a more streamlined and aesthetically pleasing overall appearance. In such an arrangement, a single elongated outer member effectively serves as two different input buttons. When one end is pushed, a first inner electrical contact is actuated, and when the other end is pushed, a second and separate inner electrical contact is made. It is usually not possible to actuate both buttons at the same time with many true cantilevered push buttons.

Such cantilevered or seesaw push buttons typically pivot about a central fulcrum, such that when one end is pushed in by a user to actuate its respective button contact, the other end actually rises upward or away from the rest of the device. Although the actual distances traveled by such cantilevered buttons when actuated can be quite small, it can still be perceived as somewhat less aesthetically appealing to have opposing ends of such cantilevered buttons move away from the device when a particular end is pushed.

In order to compensate for this issue with button ends or other portions moving away from their respective devices, some cantilevered buttons are formed from rubber, soft plastic, or other pliable materials, such that some or all of the cantilevered push button flexes to permit the non-actuated end to be held in place by the device housing or another mechanical stop while the actuated end is pushed inward. Problems with this approach can arise, however, when a metal or other less flexible material is used to construct the actual cantilever portion of the button itself.

While many designs for cantilevered or seesaw push buttons have generally worked well in the past, there is always a desire to provide other cantilever button designs or techniques that can achieve the same or similar objectives in a reliable fashion while allowing for a greater variety of possible materials that may also be more aesthetically pleasing.

SUMMARY

It is an advantage of the present invention to provide metallic or otherwise rigid cantilevered push buttons having multiple electrical contacts that also do not require the non-actuated ends of the buttons to rise when the actuated ends are pushed inward. This can be accomplished at least in part through the use of multiple fulcrums about which the cantilevered push button can pivot, with the fulcrum being determined by which end of the button is pushed.

In various embodiments of the present invention, a cantilevered push button adapted for accepting an input on an electrical or electronic device is provided. This cantilevered push button can include an elongated button top component, a first fulcrum, a second fulcrum, a first electrical contact and a second electrical contact. The elongated button top can have a first distal end associated with a first user input and a second distal end opposite the first distal end and associated with a second user input separate from the first user input. The elongated button top component is preferably disposed about an exterior surface of an electrical or electronic device and is accessible to a user. The first fulcrum can be located at the first distal end or between the first distal end and the midpoint of the elongated button top component, while the second fulcrum can be located at the second distal end or between the second distal end and the midpoint of the elongated button top component. The first electrical contact can be associated with the first distal end of the elongated button top component, while the second electrical contact can be associated with the second distal end of the elongated button top component.

When a user presses on the first distal end of the elongated button top component, then the elongated button top component can pivot about the second fulcrum and the first electrical contact is actuated. Similarly, when a user presses on the second distal end of the elongated button top component, then the elongated button top component pivots about the first fulcrum and the second electrical contact is actuated. In various embodiments, both of the first and second distal ends can be actuated simultaneously by a user during ordinary use of the device, and such simultaneous actuation can result in the entire cantilevered push button being pressed inward toward the device.

In some embodiments of this cantilevered push button, the first fulcrum can be located at the second electrical contact, and/or the second fulcrum can be located at the first electrical contact. Alternatively, the first fulcrum can be located at one distal end and the second fulcrum can be located at another distal end of the cantilevered push button. Although an optimal location for a fulcrum is at a distal end, any location that is significantly far away from the midpoint of the button is preferable. Further, although the fulcrums can be located an equal distance from the midpoint of the button, this is not necessary. Additional fulcrums may also be used, as may be desired for a given design. In particular, one fulcrum per button input is thought to be best. For example, a cantilevered button with four inputs can have four different fulcrums, with one fulcrum for each separate input.

In various embodiments, the elongated button top may be comprised of a substantially rigid material, such as a metal, hard plastic, or other inflexible material. In addition, the first and second electrical contacts can comprise dome button type electrical contacts, which may be preloaded with a positive upward force. The various foregoing features can all be included or only partially included in any desired combination for a given cantilevered push button.

In further embodiments of the present invention, an electrical or electronic device can include a housing adapted to contain one or more internal electrical device components therein, one or more user interface regions, and a cantilevered push button located at one of the user interface regions and adapted for accepting one or more inputs on said electrical device, with the cantilevered push button being any of the cantilevered push buttons described above. In the event of an electronic device, a processor located within the housing may be included, and the user interface region or regions can be in communication with the processor. A plurality of cantilevered push buttons may also be used on such a device, and may be placed at one or multiple user interface regions.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatuses and methods for providing cantilevered buttons having multiple contacts and fulcrums. These drawings in no way limit any changes in form and detail that may be made to the invention by one skilled in the art without departing from the spirit and scope of the invention.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The invention relates in various embodiments to the implementation and use of cantilevered push buttons as input mechanisms on electrical devices. Such a device can be, for example, an electronic device, such as an iPod® media player or iPhone® cellular telephone made by Apple Inc., as well as a PDA, handheld game or video game controller, radio, miniature television, keyboard, or any other electrical or electronic device that uses push buttons for user input.

In various embodiments of the present invention, a cantilevered push button having multiple contacts and multiple fulcrums is provided. The cantilevered push button can be adapted such that different fulcrums are used to pivot the button depending upon which end or portion of the button is pressed. In this manner, the overall motion and reactive displacement of the button can be controlled, even where metal or other rigid materials are used to construct the user portion of the button. The overall effect, look and feel can generally be more aesthetically pleasing to the user.

Figure 1:
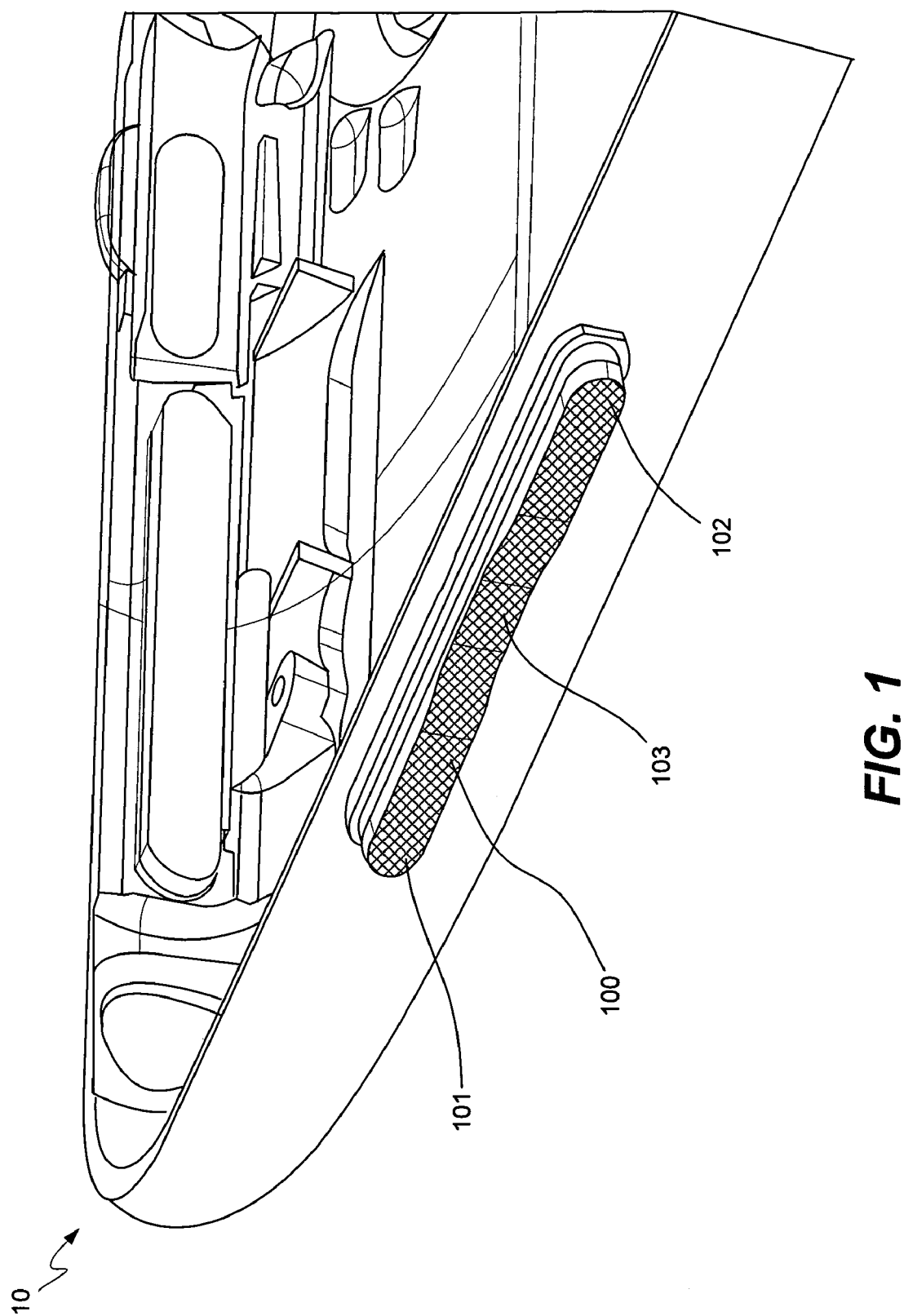
FIG. 1 illustrates in side perspective view an exemplary cantilevered button along the side of an outer housing for an associated cellular telephone.

Referring first to FIG. 1, an exemplary cantilevered button along the side of an outer housing for an associated cellular telephone is shown in side perspective view. Cellular telephone housing 10 can include various protrusions, ports and features, as will be readily appreciated. For example, a hole or recess along the side of housing 10 can be made for cantilevered push button 100. Such a button 100 can have a first distal end 101 and a second distal end 102, as well as a midpoint or center 103. Each of distal ends 101, 102 can be adapted to actuate an associated button or electrical contact within the device when they are depressed or otherwise used. Although shown on the side of a cellular telephone, there are many suitable locations for such cantilevered buttons, and numerous other types of devices can feature such a button or buttons, as will be readily appreciated by those skilled in the art.

Figure 2A:
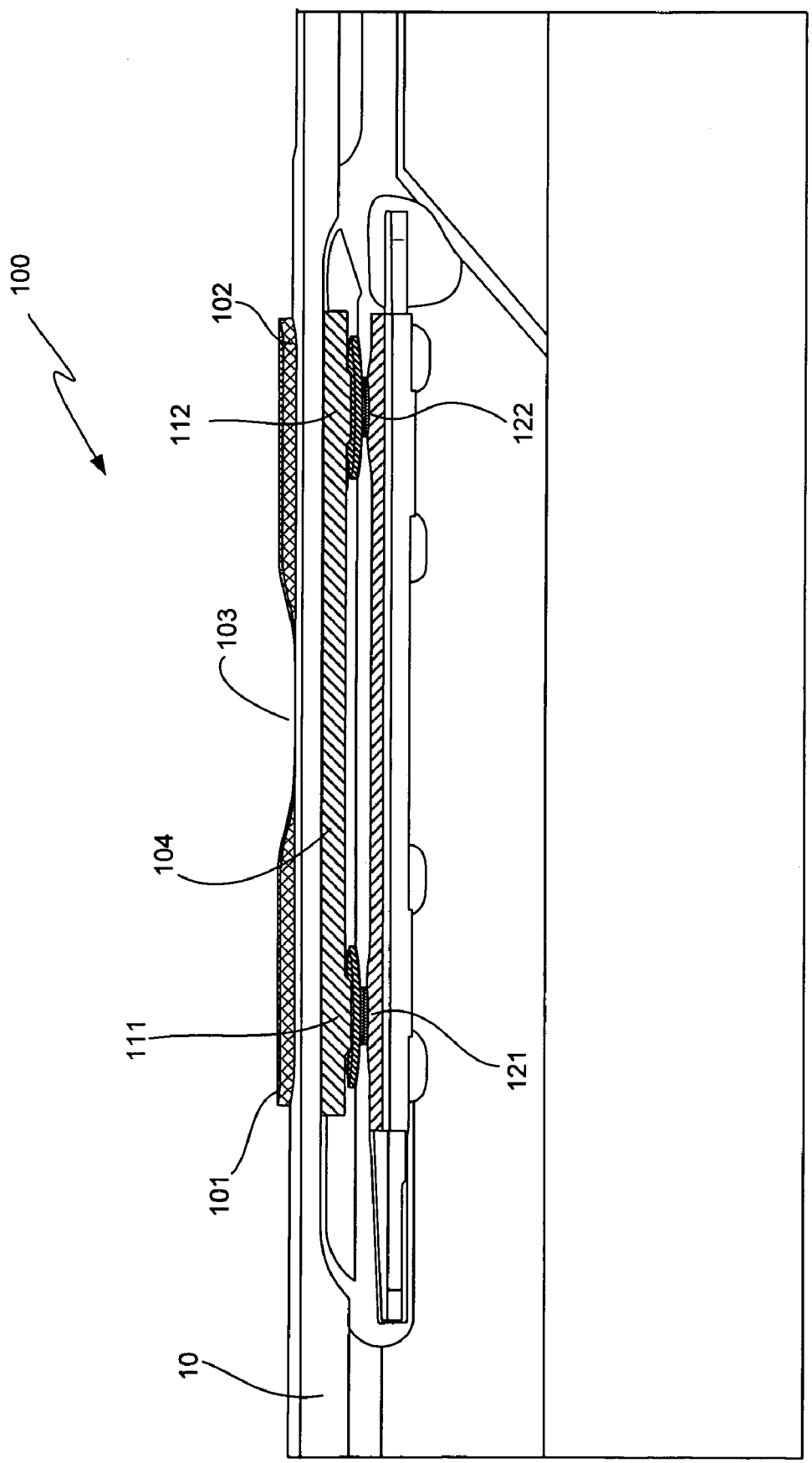
FIG. 2A illustrates in side elevation and partially cutaway view an exemplary cantilevered button according to one embodiment of the present invention.

Moving next to FIG. 2A, an exemplary cantilevered button according to one embodiment of the present invention is illustrates in side elevation and partially cutaway view. As noted above, cantilevered push button 100 can be embedded within a hole or other recess in housing 10. An elongated button top component 100 can include opposing distal ends 101, 102, and a midpoint or center 103. First distal end 101 can be associated with a first internal button or electrical contact 121 inside the device, while second distal end 102 can be associated with a second internal button or electrical contact 122 inside the device. The elongated button top component 100 is generally outside or about the device and exposed to a user, while an internal elongated button base 104 can be attached or otherwise coupled to the elongated button top component. One or more protrusions 111 in the elongated button base component 104 can be adapted to help actuate the electrical contacts 121, as will be readily appreciated.

Figure 2B:
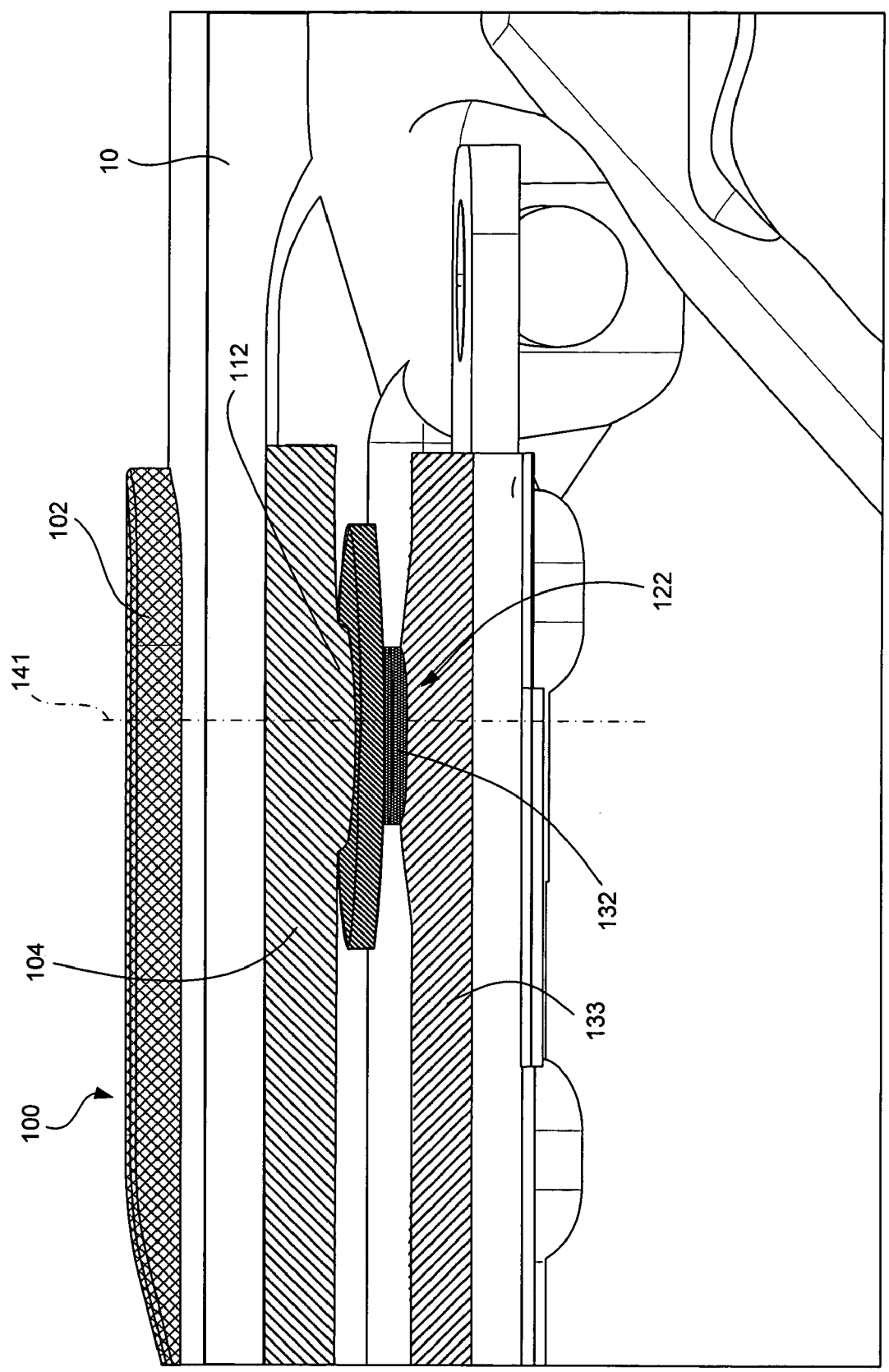
FIG. 2B illustrates in side elevation and partially cutaway view a close-up of one end of the exemplary cantilevered button of FIG. 2A.

FIG. 2B illustrates in side elevation and partially cutaway view a close-up of the right end of the exemplary cantilevered button of FIG. 2A. As shown, distal end 102 is disposed directly above internal button or electrical contact 122. Internal button or electrical contact can be, for example, a pre-loaded dome type button or other suitable electrical contact device, as will be readily appreciated by those skilled in the art. When a user presses downward on or about end 102, the button top component 100 generally depresses downward at distal end 102 and in the direction of electrical contact 122.

This forces the portion of button base 104 directly beneath end 102 downward as well, such that protrusion 112 presses on the top 132 of button or electrical contact 122, and this second "button" or electrical contact is thereby actuated. For this process of actuating second button or contact 122 by depressing second distal end 102, the actual fulcrum is at the other end of the cantilevered button and is not shown in FIG. 2B. In the event that the other end of the cantilevered button is depressed to activate the other electrical contact (both not shown in FIG. 2B), then the cantilever pivots about contact 122 (i.e., axis 141). This process is made possible due to the gap between button base 104 and internal structure 133.

Figure 2C:
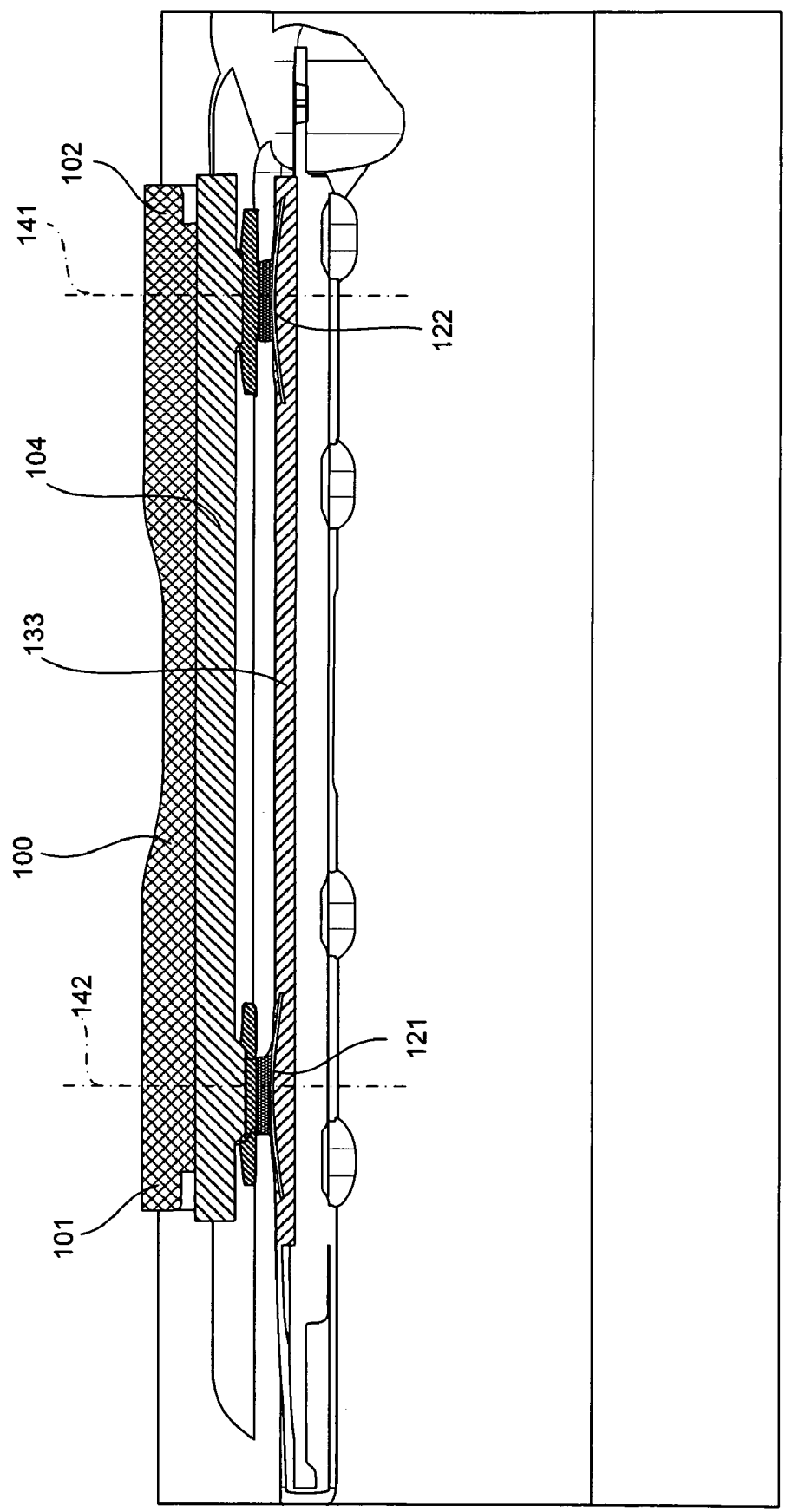
FIG. 2C illustrates in side cross-sectional view the exemplary cantilevered button of FIG. 2A.

FIG. 2C illustrates in side cross-sectional view the exemplary cantilevered button of FIG. 2A. Again, pressing at end 101 actuates contact 121, while pressing at end 102 actuates contact 122. However, the fulcrum is different for each of these different actuations. In the event that end 101 is pressed, then the fulcrum is along contact 122 (i.e., axis 141), while if end 102 is pressed, then the fulcrum is at contact 121 (i.e., axis 142). Since button base 104 is effectively separated from internal structure 133, the effective mechanical contact points between the elongated button top and base and the internal structure are at the internal buttons or electrical contacts 121 and 122. Thus, when a mechanical downward force is applied at one end above one electrical contact, the effective fulcrum is at the other electrical contact at the other end. The result is that multiple fulcrums are used with the overall cantilevered button, such that the opposite end does not perceptively extend away from the device when one end is pushed inward to activate its button.

While not necessary in order for the cantilevered push button to effectively have multiple fulcrums, the spring loaded internal button at each end aids in providing more rigidity and support to the overall device. That is, when end 101 (and thus button or contact 121) is pushed downward, the spring loaded force on contact or button 122 generally disposes end 102 to remain up and steady while button 122 is the fulcrum for the entire elongated button top component 100. Although it is thought that the top of the dome of a spring loaded dome type button makes an excellent location for a fulcrum, other locations are also possible, as will be readily appreciated. In fact, any location at a distal end or between one distal end of the cantilevered push button and its center or midpoint could be suitable for a fulcrum when the other distal end is being pressed or actuated.

As will be readily appreciated, the farther a fulcrum is away from the midpoint or center of the button, the better the effect will be as far as minimal movement of the opposite end when a particular end is pressed. Thus, an optimal location for a fulcrum can actually be at the opposite end of the button from the end that is being pressed or actuated. Conversely, a fulcrum location that is at or close to the midpoint of the button can be less desirable, although not impossible to implement in a particular design. As shown in the exemplary illustrations provided, the fulcrums used are near the distal ends of the cantilevered push button, with the results of such locations being favorable.

Also, it should be noted that the exemplary design illustrated and described herein utilized "soft" fulcrums, in that the fulcrums do provide resistance and are effective in ordinary use, but can be defeated if desired in a particular way. That is, each dome loaded electrical contact provides sufficient resistance to function as a fulcrum when the opposite end is pressed or actuated, but will not provide enough resistance to be a rigid "hard" fulcrum if force is also placed generally above it at the same time. Because a "hard" or permanent central or midpoint fulcrum is not physically present on cantilevered button 100, it is possible to depress both ends 101, 102 to actuate both internal buttons or electrical contacts 121, 122 simultaneously. In such instances, such simultaneous actuation results in the entire cantilevered push button being pressed inward toward its respective electrical or electronic device. This feature provides an additional advantage over traditional or customary cantilever buttons, in that most such devices do not permit both buttons at both ends to be actuated simultaneously. Accordingly, the respective electrical or electronic device can be designed or programmed to accept and act upon simultaneous inputs from multiple inputs on a single cantilevered button.

Figure 3A:
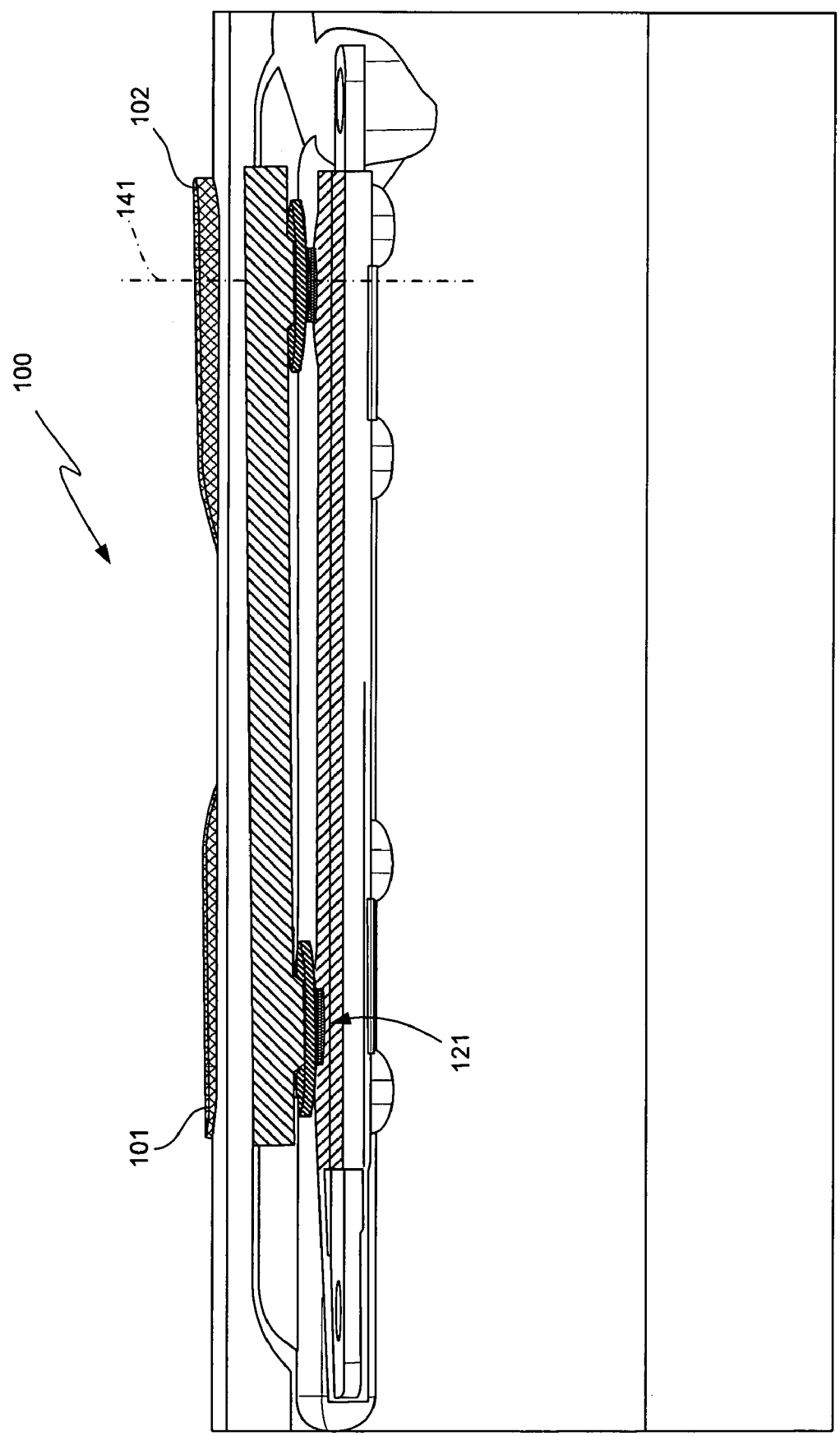
FIG. 3A illustrates in side elevation and partially cutaway view the exemplary cantilevered button of FIG. 2A with the left end actuated according to one embodiment of the present invention.
Figure 3B:
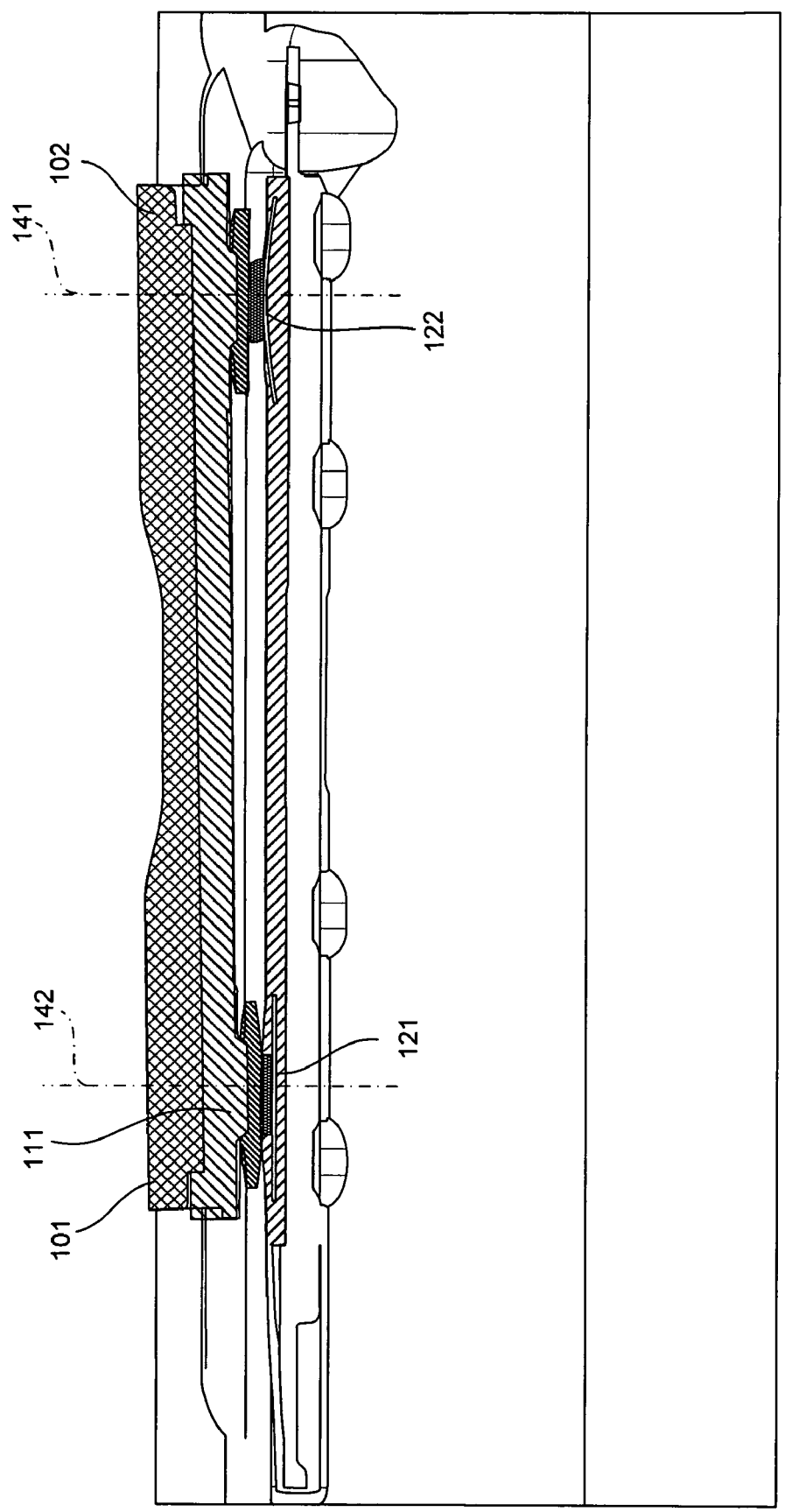
FIG. 3B illustrates in side cross-sectional view the exemplary cantilevered button of FIG. 3A with the left end actuated.

Continuing now to FIGS. 3A and 3B, the exemplary cantilevered button of FIG. 2A is shown with the left end actuated according to one embodiment of the present invention. FIG. 3A depicts a side elevation and partially cutaway view, while FIG. 3B depicts a side cross-sectional view. As illustrated, distal end 101 has been pressed downward such that protrusion 111 has activated button or electrical contact 121 directly below distal end 101. The fulcrum for the entire cantilevered button 100 for this actuation is effectively button or electrical contact 122 at the opposite end, with rotation generally being about a point atop the dome of contact 122 (i.e., along axis 141). Of course, the overall device can be substantially symmetrical in nature, such that the same relationships and results can be had for depressing distal end 102.

Again, because the fulcrum is moved away from the midpoint or center of the cantilevered button, any resulting motion rise of the opposite end is eliminated or substantially reduced when either end is pressed. This is true even where the upper portion of the cantilevered button is a rigid material, such as a metal, hard plastic or other inflexible material. As will be appreciated, such an ability provides designers with added flexibility in their choices for materials and appearances in the design and presentation of cantilevered push buttons that are fully functional and aesthetically pleasing in appearance and use.

It should be noted that although the fulcrums in the examples provided above are generally located an equal distance from the midpoint of the button, this is not absolutely necessary. For example, a particular design might favor one fulcrum being located at a distal end, and another fulcrum being located halfway between the other distal end and the midpoint of the button, or even closer to the midpoint.

Furthermore, although the foregoing examples all use a relatively simple cantilevered button with only two inputs on opposing ends, more complex buttons with additional fulcrums may also be used, as may be desired for a given design. For example, a four-way cantilevered button having four inputs and four fulcrums may be used. In such a design, the button top component may be shaped like a cross and may have a fulcrum that corresponds to each of the four different inputs at each distal end of the cross. Alternatively, the button top could be shaped like a circle, with inputs similarly at the "north," "west," "south" and "east" coordinates of the circle. The use of a simple single user input on such a button (e.g., "north") could result in a pivoting about an opposing fulcrum (e.g., "south"), similar to the two input elongated cantilevered push button in the foregoing examples. In such an embodiment, the simultaneous actuation of two adjacent inputs (e.g., north and east), could result in the simultaneous pivoting about the two opposing fulcrums for those inputs (e.g., south and west). Similar to the foregoing two input button embodiments, a cantilevered push button having four or more inputs could also have "soft" fulcrums, such that the entire button and all inputs could be actuated at once. As will be readily appreciated, further designs and additional inputs for even more complex cantilevered buttons having multiple fulcrums could also be used within the spirit of the present invention.

Although the foregoing invention has been described in detail by way of illustration and example for purposes of clarity and understanding, it will be recognized that the above described invention may be embodied in numerous other specific variations and embodiments without departing from the spirit or essential characteristics of the invention. For example, although many illustrations have pointed to the use of metal as the material for the cantilevered push button, a rigid and inflexible plastic or other material may alternatively be used. Multiple materials may also be used to form the button. Other changes and modifications may be practiced, and it is understood that the invention is not to be limited by the foregoing details, but rather is to be defined by the scope of the appended claims.

What is claimed is:

1. A cantilevered push button adapted for accepting one or more inputs on an electrical or electronic device, comprising:
   a button top component having a first distal end associated with a first user input and a second distal end opposite said first distal end and associated with a second user input separate from said first user input, wherein said button top component is disposed about an exterior surface of an electrical or electronic device and is accessible to a user, and wherein both of said first and second distal ends can be actuated simultaneously by a user during ordinary use of said electrical or electronic device;
   a first fulcrum located at said first distal end or between said first distal end and the midpoint of said button top component;
   a second fulcrum located at said second distal end or between said second distal end and said midpoint of said button top component;
   a first electrical contact associated with said first distal end of said button top component, wherein said button top component pivots about said second fulcrum and said first electrical contact is actuated when a user presses on said first distal end; and
   a second electrical contact associated with said second distal end of said button top component, wherein said button top component pivots about said first fulcrum and said second electrical contact is actuated when a user presses on said second distal end.

2. The cantilevered push button of claim 1, wherein said first fulcrum is located at said second electrical contact.

3. The cantilevered push button of claim 2, wherein said second fulcrum is located at said first electrical contact.

4. The cantilevered push button of claim 1, wherein said button top component is comprised of a substantially rigid material.

5. The cantilevered push button of claim 4, wherein said button top component is metal.

6. The cantilevered push button of claim 1, wherein said first fulcrum is located at said first distal end and said second fulcrum is located at said second distal end.

7. The cantilevered push button of claim 1, wherein said first and second electrical contacts comprise dome button type electrical contacts.

8. The cantilevered push button of claim 7, wherein said dome button type electrical contacts are preloaded with a positive upward force.

9. The cantilevered push button of claim 1, wherein said simultaneous actuation results in the entire cantilevered push button being pressed inward toward said electrical or electronic device.

10. The cantilevered push button of claim 1, wherein said button top component is adapted to be disposed through an opening of and not contact a housing of said electrical or electronic device.

11. An electrical device, comprising:
    a housing adapted to contain one or more internal electrical device components therein;
    one or more user interface regions; and
    a cantilevered push button located at one of said one or more user interface regions and adapted for accepting one or more inputs on said electrical device, wherein said cantilevered push button includes
       an elongated button top component having a first distal end associated with a first user input and a second distal end opposite said first distal end and associated with a second user input separate from said first user input, wherein said elongated button top component is disposed about an exterior surface of an electrical or electronic device and is accessible to a user, and wherein both of said first and second distal ends can be actuated simultaneously by a user during ordinary use of said electrical device,
       a first fulcrum located at said first distal end or between said first distal end and the midpoint of said elongated button top component,
       a second fulcrum located at said second distal end or between said second distal end and said midpoint of said elongated button top component;
       a first electrical contact associated with said first distal end of said elongated button top component, wherein said elongated button top component pivots about said second fulcrum and said first electrical contact is actuated when a user presses on said first distal end, and
       a second electrical contact associated with said second distal end of said elongated button top component, wherein said elongated button top component pivots about said first fulcrum and said second electrical contact is actuated when a user presses on said second distal end.

12. The electrical device of claim 11, wherein said electrical device comprises an electronic device.

13. The electrical device of claim 11, wherein said first fulcrum is located at said second electrical contact.

14. The electrical device of claim 13, wherein said second fulcrum is located at said first electrical contact.

15. The electrical device of claim 11, wherein said elongated button top component is comprised of a substantially rigid material.

16. The electrical device of claim 11, wherein said first and second electrical contacts comprise dome button type electrical contacts.

17. The electrical device of claim 11, wherein said simultaneous actuation results in the entire cantilevered push button being pressed inward toward said electrical device.

18. The electrical device of claim 11, wherein said elongated button top component is disposed through an opening in said housing and does not contact said housing.

19. An electronic device, comprising:
    a housing adapted to contain one or more internal electrical device components therein;
    a processor located within said housing;
    one or more user interface regions having one or more user interface components in communication with said processor; and
    one or more cantilevered push buttons located at at least one of said one or more user interface regions and adapted for accepting a plurality of inputs on said electronic device, wherein each of said one or more cantilevered push buttons includes an elongated button top component having a first distal end associated with a first user input and a second distal end opposite said first distal end and associated with a second user input separate from said first user input, wherein said elongated button top component is disposed through an opening in said housing, does not contact said housing, and is accessible to a user, a first fulcrum and a second fulcrum about which said elongated button top pivots when actuated by a user, a first electrical contact associated with said first distal end of said elongated button top component, wherein said elongated button top component pivots about said second fulcrum and said first electrical contact is actuated when a user presses on said first distal end, and a second electrical contact associated with said second distal end of said elongated button top component, wherein said elongated button top component pivots about said first fulcrum and said second electrical contact is actuated when a user presses on said second distal end.

20. The electronic device of claim 19, wherein both of said first and second distal ends can be actuated simultaneously by a user during ordinary use of said electronic device.

* * * * *